United States Patent
Schachtl et al.

(10) Patent No.: US 7,040,473 B2
(45) Date of Patent: May 9, 2006

(54) ELECTROMAGNETIC FRICTION CLUTCH FOR A VEHICLE DOOR

(75) Inventors: Stephan Schachtl, München (DE); Thomas Humez, Dachau (DE)

(73) Assignee: Valeo Sicherheitssysteme GmbH, Erdweg (DE)

( * ) Notice: Subject to any disclaimer, the term of this patent is extended or adjusted under 35 U.S.C. 154(b) by 79 days.

(21) Appl. No.: 10/492,293

(22) PCT Filed: Oct. 17, 2002

(86) PCT No.: PCT/EP02/11637

§ 371 (c)(1),
(2), (4) Date: Apr. 13, 2004

(87) PCT Pub. No.: WO03/036119

PCT Pub. Date: May 1, 2003

(65) Prior Publication Data

US 2004/0245064 A1    Dec. 9, 2004

(30) Foreign Application Priority Data

Oct. 19, 2001  (DE) ................................ 101 52 697

(51) Int. Cl.
*F16D 67/02* (2006.01)
(52) U.S. Cl. .................................................. 192/84.91
(58) Field of Classification Search .............. 192/48.9, 192/84.9, 84.91, 84.94
See application file for complete search history.

(56) References Cited

U.S. PATENT DOCUMENTS 5,896,703 A     4/1999  Wright et al.
5,911,291 A *   6/1999  Suetake et al. ............... 192/35

FOREIGN PATENT DOCUMENTS

DE   102 25 580 A1 *  12/2005
GB        890413       2/1962
JP       11301271     11/1999

* cited by examiner

*Primary Examiner*—Saul Rodriguez
(74) *Attorney, Agent, or Firm*—Berenato, White & Stavish, LLC

(57) ABSTRACT

The invention relates to an electromagnetic friction clutch for arrangement within a drive train connecting a drive motor and a vehicle door. The vehicle door is reliably held in any intermediate position when a clutch is disconnected. To preserve the ability to carry out a manual emergency actuation of the vehicle door, a compression spring is provided acting upon an armature disk of the clutch in the axial direction in such a way that, with the clutch in the disconnected state, the armature disk is pressed against the frictional lining of a rotor part with a force which is sufficient to ensure that the vehicle door remains reliably in position. During a subsequent manual actuation of the vehicle door, the frictional connection between armature disk and frictional lining can be overcome.

9 Claims, 2 Drawing Sheets

ELECTROMAGNETIC FRICTION CLUTCH FOR A VEHICLE DOOR

Figure 1:
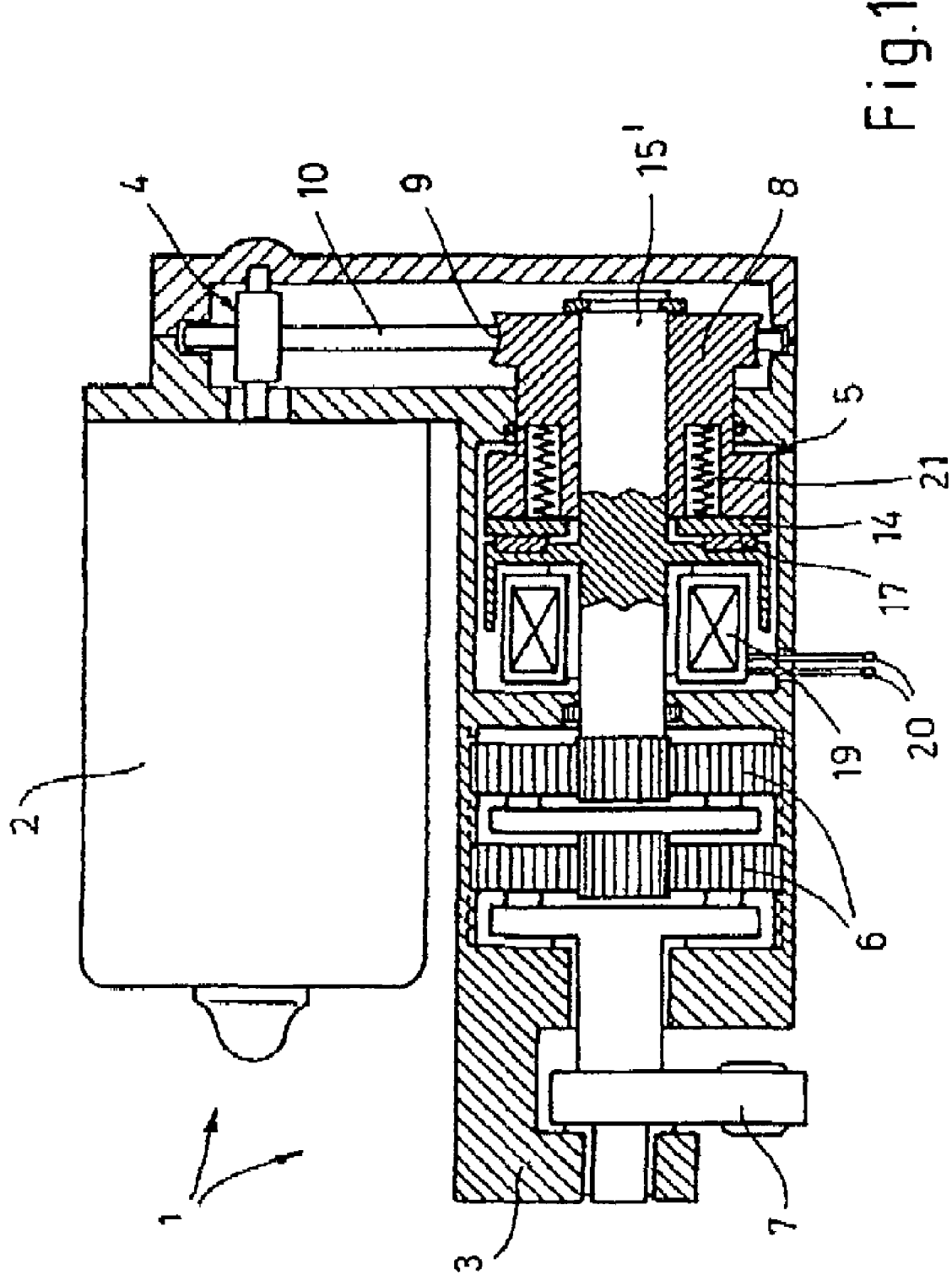

The invention relates to an electromagnetic friction clutch for arrangement within a drive train connecting a drive motor and a vehicle door or vehicle flap (tailgate, drive motor hood, etc.).

In motor vehicles with an automatically actuable vehicle door or vehicle flap (hereafter also designated in summary simply as a vehicle door), the vehicle door is closed or opened, for example, by the driver of the vehicle as a result of a corresponding actuation of a switch provided in the instrument panel. For this purpose, the switching signal generated by the switch acts on an electronic control device which itself generates electrical control signals for activating an electric motor which, in turn, then pivots or displaces the vehicle door via a following gear unit and further transmission elements.

These known motor vehicles have the disadvantage, inter alia, that, when the vehicle door is pressed shut manually, a high resistance has to be overcome on account of the gear unit or electric motor operatively connected to the vehicle door and an increased wear of these components occurs.

To avoid wear of this kind, an automatically actuable vehicle door has already been proposed, in which the motor or the gear unit following the motor can be decoupled by means of an electromagnetic clutch from the drive shaft actuating the vehicle door, so that, with the clutch in the disconnected state, a manual actuation of the vehicle door is possible, without the movement of the latter being inhibited by the structural units (for example, electric motor or intermediate gear unit) arranged on the drive shaft of the clutch.

Electromagnetic clutches of this type are designed, as a rule, as friction clutches and therefore comprise a rotor part which is provided with a friction lining and is connected fixedly in terms of rotation to a first shaft and which has arranged on its side facing away from the friction lining an electrical coil, and an armature disk which is connected fixedly in terms of rotation, but axially displaceably, to a second shaft and which, with the clutch in the connected state, is drawn against the friction lining of the rotor part of the first shaft and makes a frictional connection between the two shafts. With the clutch in the disconnected state, the armature disk and the rotor part are pressed apart from one another by means of a spring, so that there is an exactly predetermined gap-like clearance between the armature disk and the friction lining.

The abovementioned vehicle doors have the disadvantage, however, that, in the dead state, because of the open clutch, the vehicle door is easily moveable and is often exposed in an uncontrolled way to the forces acting on it (gravity, springing of the suspension, dampers, etc.) when it is in an intermediate position between the closed and the open position. When a spring of appropriate strength is present, after the opening of the clutch, tailgates are, as a rule, pivoted out of the intermediate position into the open end position, even though the vehicle door is often to remain standing in the respective intermediate position for safety reasons.

The object on which the invention is based is to specify a clutch of the type initially mentioned, by means of which what is achieved in a simple way is that the vehicle door is held reliably in any intermediate position when the clutch is in its disconnected state. Moreover, the possibility of being able to carry out a manual emergency actuation of the vehicle door is to be preserved.

This object is achieved, according to the invention, by means of the features of claim 1. Further, particularly advantageous refinements of the invention are disclosed in the subclaims.

The invention is based essentially on the idea of providing an elastic element, for example a compression spring, which acts upon the armature disk of the clutch in the axial direction, in such a way that, with the clutch in the disconnected state, the armature disk is pressed against the friction lining of the rotor part with a force which is sufficiently high to ensure that the vehicle door remains standing reliably in the respective position assumed during the disconnection of the clutch, and in such a way that, during a subsequent manual actuation of the vehicle door, the frictional connection between armature disk and friction lining can be overcome.

The invention has the advantage that the gap dimensional setting, which is relatively complicated when conventional clutches are used, is dispensed with completely. Moreover, because of the preloading by means of the spring, the clutch, in the connected state, can transmit a higher torque than a comparable clutch without preloading.

In a first embodiment of the invention, the second shaft is connected fixedly in terms of rotation on the outside to a driver part comprising axial guide parts which engage into corresponding slot-like recesses of the armature disk. Advantageously, the driver may also have at least one blind hole bore, open on the side facing the armature disk, for receiving the compression spring used as an elastic element.

In order to achieve a space-saving arrangement of the clutch, there is provision, in a second embodiment of the invention, for one of the two shafts to be designed as a hollow shaft, into which the other shaft in each case projects at least partially and by which this shaft is then guided radially. In this case, the shaft designed as a hollow shaft may carry on the outside a gearwheel or worm wheel which is operatively connected to the drive motor via drive elements.

In a further embodiment of the invention, there is provision for the housing surrounding the clutch to be designed in such a way that it additionally comprises both a gear stage following the clutch, for driving a drive lever actuating the vehicle door, and a gear stage which precedes the clutch and via which the clutch is connected to the drive motor flanged to the housing. By means of this measure, it is possible in a simple way to construct the entire drive for actuating the vehicle door as a prefabricatable module.

To adapt the clutch according to the invention to different motor vehicles or vehicle types, it is often necessary merely to exchange the spring which presses the armature disk against the friction lining.

Figure 2:
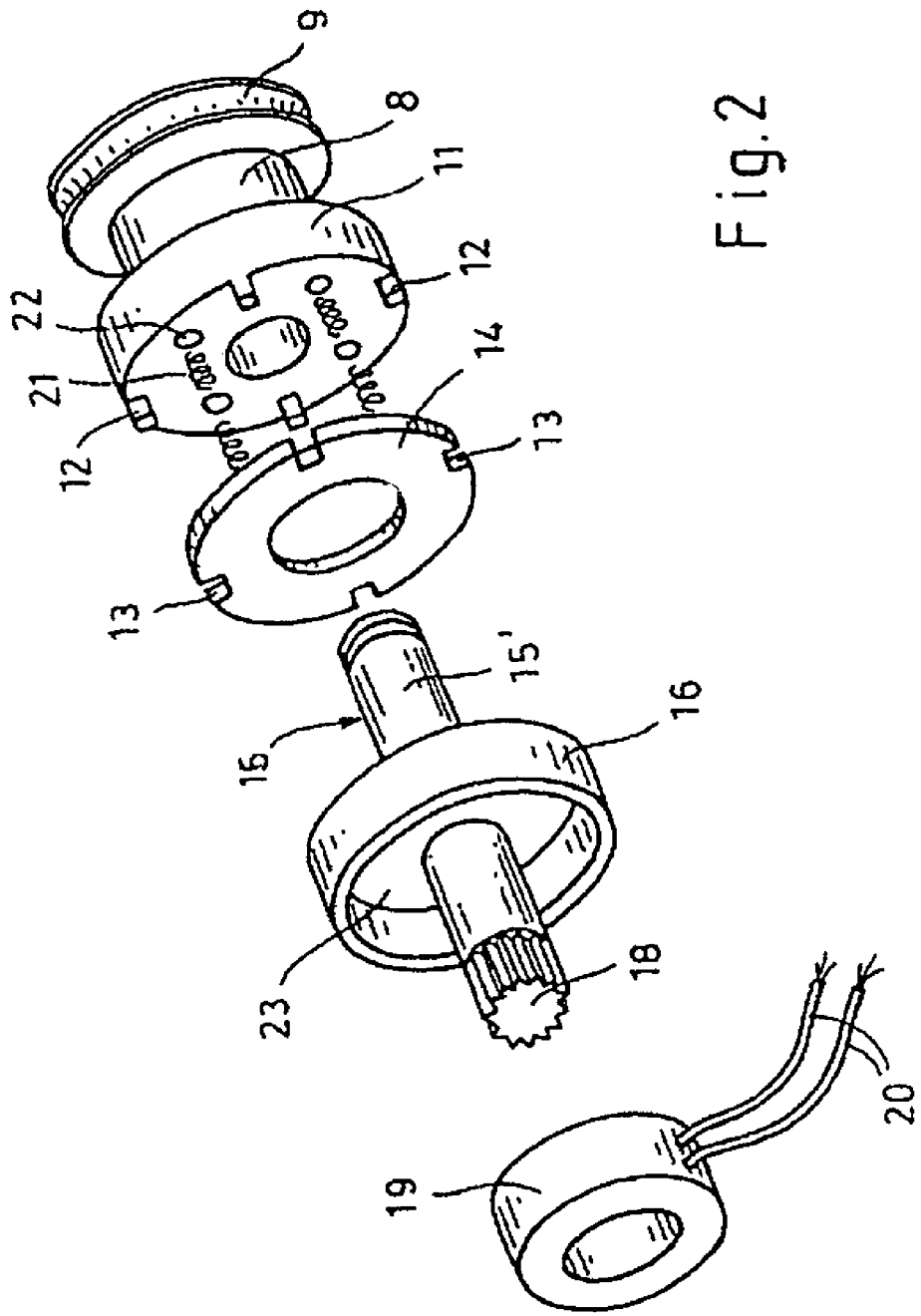

Further details and advantages of the invention may be gathered from the following exemplary embodiments explained with reference to figures, of which:

FIG. 1 shows a diagrammatic side view, illustrated partially in section, of a drive unit for an automatic vehicle door with a clutch according to the invention, and FIG. 2 shows an exploded illustration of the clutch reproduced in FIG. 1, the individual parts of the clutch being illustrated in perspective.

In FIG. 1, 1 designates a drive unit for the automatic actuation of a tailgate, not illustrated, of a motor vehicle. The drive unit 1 comprises an electric motor 2 which is flanged to a housing 3. The electric motor 2 is connected, via a worm gear unit 4 arranged in the housing 3 and via an electromagnetic friction clutch 5 according to the invention, to a two-stage epicyclic gear unit 6 which acts on a pivotable drive lever 7. The drive lever 7 is connected fixedly in terms of rotation to a hinge strap, not illustrated, of the tailgate and causes the closing of the latter insofar as the electric motor 2 is live and the clutch 5 is closed.

The clutch 5 comprises a hollow shaft 8 which is provided, in the region of its first end, with a worm wheel 9, into which the worm 10 of the worm gear unit 4 engages. The hollow shaft 8 carries, in the region of its second end, a driver part 11, on which four guide parts 12 extending in the axial direction are arranged. These guide parts 12 engage into corresponding recesses 13 of an axially displaceable armature disk 14 which, however, is connected fixedly in terms of rotation to the hollow shaft 8.

The clutch 5 comprises, furthermore, a shaft 15 which carries a cup-shaped rotor part 16 which is connected fixedly in terms of rotation to the latter and which, on its end facing the armature disk 14, has a friction lining 17. That region 15' of the shaft 15 which lies in front of the rotor part 16 is led through the hollow shaft 8 and is guided radially by the latter. Arranged fixedly in terms of rotation on the opposite end of the shaft 15 is a gearwheel 18 which cooperates with the epicyclic gear unit 6.

Located in a recess 23, on that side of the cup-shaped rotor part 16 which faces away from the friction lining 17, is a coil 19 which is arranged fixedly with respect to the housing and the electrical connections of which are designated by 20.

According to the invention, then, there is provision for the armature disk 14 to be pressed constantly against the friction lining 17 by means of compression springs 21 which are mounted in corresponding blind hole bores 22 of the driver part 11 or of the hollow shaft 8. In this case, the spring constants of the compression springs 21 are selected such that, with the clutch 5 in the disconnected state, the armature disk 14 is pressed against the friction lining 17 of the rotor part 16 with a force which is sufficiently high to ensure that the tailgate remains standing reliably in the respective position assumed during the disconnection of the clutch 5, and such that, during a subsequent manual actuation of the tailgate, the frictional connection between armature disk 14 and friction lining 17 can be overcome, so that, in the event of manual emergency actuation, no appreciable load and therefore also no appreciable wear of the worm gear unit 4 or electric motor 2 occur.

The invention, of course, is not restricted to the exemplary embodiment described above. Thus, for example, the electrical coil 19 does not necessarily need to be arranged fixedly with respect to the housing. Instead, it may also be connected fixedly in terms of rotation to the rotor part 16, insofar as its connections 20 are connected to corresponding slip rings arranged on the rotor part 16 or the shaft 15.

The compression springs 21 may also be, for example, pneumatic springs or other elastic parts.

Moreover, the shaft carrying the rotor part does not necessarily have to be mounted in a hollow shaft, but, instead, in the case of an appropriate mounting, the two shafts of the clutch may also be arranged axially one behind the other and consist, for example, of a solid material.

LIST OF REFERENCE SYMBOLS

1 Drive unit
2 Electric motor, drive motor
3 Housing
4 Worm gear unit, gear stage
5 Clutch
6 Epicyclic gear unit, gear stage
7 Drive lever
8 Hollow shaft, second shaft
9 Worm wheel
10 Worm
11 Driver part
12 Guide part
13 Recess
14 Armature disk
15 Shaft, first shaft
15' Region
16 Rotor part
17 Friction lining
18 Gearwheel
19 Coil
20 Connection
21 Compression spring, elastic element
22 Blind hole bore
23 Recess (rotor part)

The invention claimed is:

1. Electromagnetic friction clutch for a vehicle door or a vehicle access cover, for arrangement inside a driveline connecting a drive motor (2) and one of a vehicle door and a vehicle access cover, comprising a clutch (5), which is arranged in a housing (3), said clutch (5) comprising a rotor part (16), which is provided with a friction lining (17) and is rotationally locked to a first shaft (15), and on which an electrical coil (19) is arranged on a side remote from the friction lining (17), and an armature plate (14) which is rotationally locked to but axially displaceable on a second shaft (8) and which when the clutch (5) is energized is drawn against the friction lining (17) of the rotator part (16) on the first shaft (15), establishing a frictional connection between the two shafts (8, 15),
   wherein the armature plate (14) is acted upon in an axial direction by at least one elastic element (21), in such a way that when the clutch (5) is de-energized the armature plate (14) is pressed against friction lining (17) of the rotor part (16) with a force which in operation is sufficient to maintain the vehicle door or the vehicle access cover securely in the respective position assumed when the clutch (5) was de-energized, and that the frictional connection between the armature plate (14) and the friction lining (17) can be overcome on subsequent manual operation of the vehicle door or vehicle access cover.

2. Clutch according to claim 1, wherein the elastic element (21) is a compression spring.

3. Clutch according to claim 1, wherein externally the second shaft (8) is rotationally locked to a carrier part (11), which comprises axial guide parts (12), which mesh in corresponding groove-shaped recesses (13) in the armature plate (14).

4. Clutch according to claim 3, wherein the second shaft (8) or the carrier part (11) contains at least one blind hole (22), open on the side facing the armature plate (14), for receiving the compression spring (21).

5. Clutch according to claim 1, wherein one of the two shafts (8, 15) takes the form of a hollow shaft (8), into which the other shaft (15) at least partially extends and which guides the other shaft (15) radially.

6. Clutch according to claim 5, wherein the shaft which takes the form of a hollow shaft (8) externally supports a gear wheel or worm wheel (9), which is operatively connected by way of drive elements to the drive motor (2).

7. Clutch according to claim 1, wherein the rotor part (16), on said side remote from the friction lining (17), has a recess (23), in which the coil (19) is at least partially arranged.

8. Clutch according to claim 1, wherein the coil (19) is supported by being fixed to the housing.

9. Clutch according to claim 1, wherein the clutch (5) is arranged in a housing (3), which in addition comprises at least one gear stage (6) connected to the output side of the clutch (5) for driving an actuating lever (7) operating the vehicle door, and a gear stage (4) connected to the input side of the clutch (5), by way of which the clutch (5) is connected to the drive motor (2), flange-mounted on the housing (3).

* * * * *